United States Patent Office 3,303,180
Patented Feb. 7, 1967

3,303,180
METHOD AND APPARATUS FOR THE MANUFACTURE OF CRUMB RUBBER FROM RUBBER SOLUTIONS
Gunter Beckmann, Marl, Paul Bernemann, Haltern, and Wilhelm Schanzer and Hans Westermann, Marl, Germany, assignors to Chemische Werke Huls Aktiengesellschaft, Marl, Germany, a corporation, of Germany
Filed Apr. 24, 1963, Ser. No. 275,398
Claims priority, application Germany, Sept. 15, 1962, C 27,946
1 Claim. (Cl. 260—94.7)

It is known to prepare crumb rubber from rubber solutions by introducing the solutions into a vessel equipped with an agitator and filled with water near the boiling point. The solvent and part of the water will evaporate while the crumb rubber remains dispersed in the water due to the action of the agitator. Such methods have the disadvantage that together with the vapor of the solvent an amount of aqueous vapor will flow to the condenser which substantially exceeds the theoretically necessary amount, especially when solvents are used which have boiling points above 60° C. The term "theoretically necessary" means the amount of aqueous vapor which is computed from the vapor pressure ratio that exists when a mixture of water and the solvent reaches its boiling point. The reason for the greater amount of aqueous vapor flowing to the condenser is the fact, proved by experience, that the temperature within the coagulation vessel must be set at a value that exceeds the boiling temperature of the water-solvent mixture. The temperature must be kept close to the boiling point of water (90 to 100° C.) in order to prevent a clotting of the rubber crumbs within the agitator vessel. The adversely acting vapor mixture of high aqueous vapor content reduces crucially the thermodynamic efficiency of such plants.

It has been found that it is possible to prepare crumb rubber from rubber solutions by introducing the rubber solutions into a water-filled heated agitator vessel advantageously at a temperature only slightly above the boiling point of the mixture of water and the solvent if an agitator is used the blades of which are knife-shaped and rotate at a peripheral speed above 20 m./sec., the agitator most appropriately being arranged in such way that the liquid rotates only relatively slowly in the vessel so that the blades will cut the liquid at a high relative speed.

The method is suitable for the working up of rubber solutions, for example polymerization products of diolefines such as butadiene and isoprene, copolymerization products of monoolefines such as propylene/ethylene, butylene/ethylene and propylene/butylene, and copolymerization products of mono- and diolefines dissolved in aliphatic and aromatic hydrocarbons.

Apparatus embodying the invention is illustrated in the accompanying drawings in which.

Figure 1:
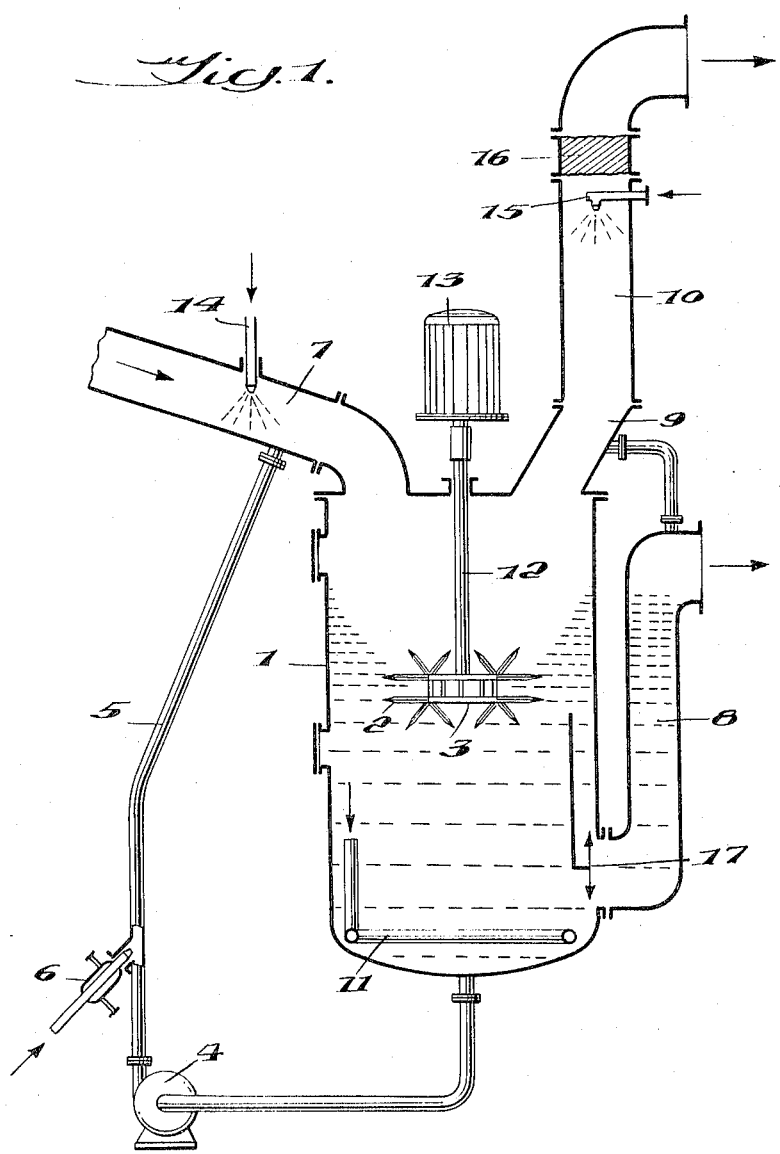
FIG. 1 is a diagrammatic front elevation of the complete apparatus.
Figure 2:
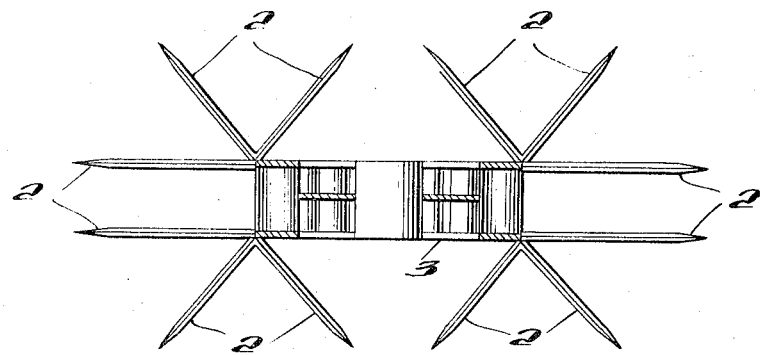
FIG. 2 is an enlarged front elevation of the stirrer.
Figure 3:
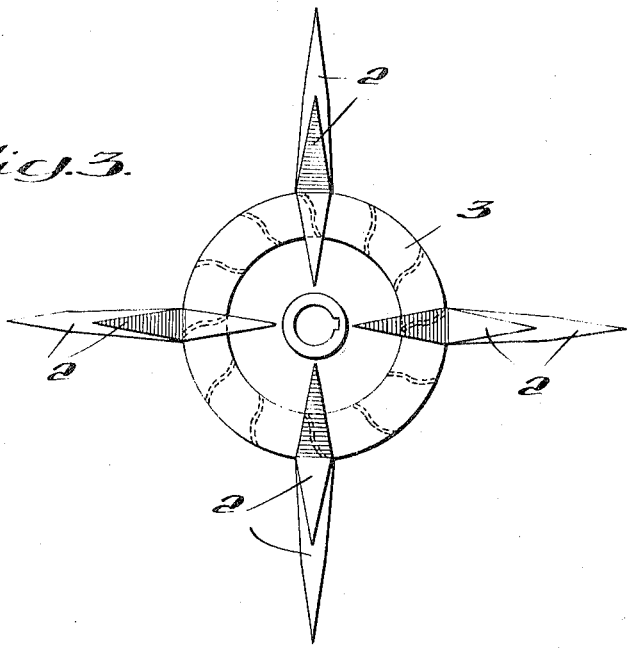
FIG. 3 is an enlarged plan view of the stirrer.

The apparatus comprises a vessel 1 of circular cross-section provided with means (not shown) for insulating and heating the wall thereof.

The vessel 1 is provided with the agitator the blades of which are knife-shaped. The blades 2 are fastened at the hub 3 and are rotated so fast by the shaft 12 and motor 13 that the outer points of the blades have a peripheral speed of 20 m./sec. or higher, preferably between 25 and 30 m./sec.

The agitator is arranged in such manner that the hub portion 3 which carries the blades rotates within the vapor space of the vortex created in the liquid and that the radially arranged blades will cut the carabolic surface of the liquid only with their outer tips which are sharpened and gently tapered. The small depth of immersion of the blades in the liquid and the stream-lined design of the ends of the blades will result in only a small peripheral force for setting the liquid into circular motion inspite of the high peripheral speed of the blades. This lowers first the output requirements of the motor 13 and secondly accomplishes a high relative speed of the blades in relation to the liquid because of the slow rotating speed of the latter. The high relative velocity will cause extraordinary high shear stresses within the zone directly in front of the sharpened cutting edges of the blades. Since the rubber solution and the crumbs have a specific weight that is lighter than water, the rubber-containing component will concentrate within the upper and inner zone of the vessel 1, and especially near the surface of the vortex, that is, the area where the blades are cutting. The effect of this arrangement is a particularly great cutting frequency as well as a greater suspension time of the rubber-containing elements in the vessel 1 in comparison with the mean dwell time of the water in the vessel with the result that the space-time yield of the process will be favorably influenced.

The above given characteristics are instrumental in accomplishing such a degree of subdivision of the mixture that it becomes feasible to expel the solvent at a low temperature and at a high rate of flow while the rubber is being formed into crumbs, with a formation of larger agglomerated pieces from such crumbs being effectively inhibited.

It is also feasible to arrange the agitator eccentrically, obliquely or horizontally or completely below the water surface.

The contents of the vessel 1 are circulated by the pump 4. The rubber solution enters through nozzle 6 which is cooled and discharges into the riser 5. The cooling will prevent clogging of the nozzle. The riser 5 delivers the water, rubber solution, rubber crumbs and vapor through the vapor intake 7 into the vessel 1. The water level in the vessel 1 is maintained by use of an overflow device 8 having an adjustable gate 17. Through the vapor intake 7, connected to the cover of the vessel, vapors are introduced which are obtained from agitators (not shown) arranged in succession to vessel 1 and used for the purpose of distilling the crumbs still more thoroughly. In this manner the energy of these very hot vapors is utilized for heating the contents of vessel 1. A vapor outlet 9 of larger diameter, also connected to the cover of the vessel, carries all vapors from the vessel 1 through a column 10 provided with spray nozzle 15 and a layer of filling material 16 to the condenser (not shown). Fresh water, its temperature being lower than the temperature within the vessel 1 can be introduced into the process by spraying it into the column 10 through the nozzle 15. This water spray will be heated by the vapors flowing through it. At the same time components of the vapors, namely a percentage of the aqueous vapor, will condense due to the withdrawal of heat and flow back into the vessel 1 in the form of water, thereby reducing the amount of aqueous vapor passing to the condenser. Water that is carried by the solvent-free rubber crumbs out of the processing cycle is separated from these crumbs and a portion of this water is returned to the vessel 1 through the spray nozzle 14 in the vapor intake 7. A pipe 11 carrying steam is used as auxiliary heating means for the vessel 1 but will be utilized only if it is not possible to supply sufficient energy through the vapor inlet 7.

The apparatus is operated most advantageously in such manner that the temperature at the head of column 10 is slightly above the boiling temperature of the solvent-water mixture. The temperature within the vessel 1 will then adjust itself automatically and will be substantially identical with the temperature at the head of the column. In this manner it becomes possible to attain an almost maximum thermal efficiency of the evaporation. In other words it becomes possible to keep the water content of the vapors flowing to the condenser almost as low as the water content of vapors above a boiling mixture of pure solvent and water while still avoiding any disadvantageous formation of rubber agglomerates.

*Example*

Into the vessel 1 with a capacity of 1.5 m.³ and with its water content at a temperature of 72° C. there are introduced 2000 kg./per hour of a 14% benzene solution of polybutadiene through the cooled nozzle 6 and the riser 5 with liquid circulating through the latter at the rate of approximately 15 m.³/per hour. The agitator rotates at 745 r.p.m., and the ends of the knife blades 2 have a peripheral speed of 26 m./sec., 4 m.³/per hour of water which has been separated from the discharge and distilled crumb rubber and has a temperature of 80° C. are added through the spray nozzle 14 located in the intake 7. .5 m.³/ per hour of fresh water (at 40° C.) is sprayed into the column 10 through the spray nozzle 15. The vapors from a vessel (not shown) which is used for final and complete distillation of the crumbs and is operated at a temperature between 98 and 100° C., flow into the vessel 1 through the inlet 7, carrying the energy necessary for the evaporation of the benzene. The temperature of the vapors flowing toward the condenser within the column above the layers of filling material 16 is 73° C. The aqueous vapor ratio of the vapors is only 12 percent by weight. The rubber crumbs produced in the vessel 1 have diameters ranging from 1 to 4 mm. Agglomerations do not occur, not even after several hours of operation. The crumbs leave the vessel 1 dispersed in water through the overflow 8.

The crumbs when leaving the vessel 1 have a benzene content of approximately 30 percent by weight (relative to dry material). The benzene is removed completely from the crumbs in a vessel (not shown) which is agitated by a simple propeller. Again, no agglomeration will occur. The entire amount of steam required within the system is introduced into said solvent evaporating vessel. The amount of steam saturated at 4 atmospheres is 800 kg./per hour.

We claim:

Method for the preparation of crumb rubber from solutions of rubber in organic solvents which comprises introducing a solution of rubber into a body of water maintained at substantially the boiling temperature of the resulting water-solvent mixture in a vessel of horizontal, circular cross section, agitating the resulting mixture by means of flat, knife-like blades having no pitch relative to their planes of rotation and rotating at a peripheral speed of at least 20 m./sec. whereby said mixture forms a vortex in said container and only the tips of said blades penetrate only the parabolic surface thereof.

References Cited by the Examiner

UNITED STATES PATENTS

| | | | |
|---|---|---|---|
| 2,478,703 | 8/1949 | Moore | 260—85.1 |
| 2,495,147 | 1/1950 | Street | 260—94.7 |
| 2,833,750 | 5/1958 | Vickers | 260—85.1 |
| 2,905,658 | 9/1959 | Dietz | 260—85.1 |
| 2,957,855 | 10/1960 | McCleod | 260—94.7 |
| 3,104,947 | 9/1963 | Switzer et al. | 23—165 |

JOSEPH L. SCHOFER, *Primary Examiner.*

H. I. CANTOR, *Assistant Examiner.*